Figure 1:
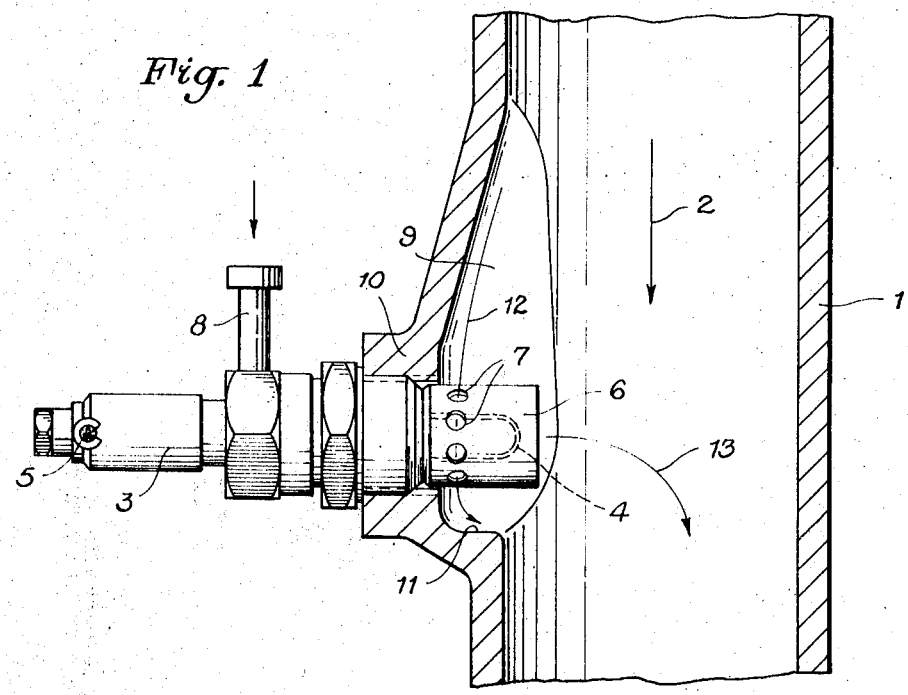

PATENTED FEB 9 1971

3,561,413

INVENTOR

Hansjürgen Zürner

United States Patent

[11] 3,561,413

| [72] | Inventor | Hansjurgen Zurner<br>Nurnberg, Germany |
|---|---|---|
| [21] | Appl. No. | 767,320 |
| [22] | Filed | Oct. 14, 1968 |
| [45] | Patented | Feb. 9, 1971 |
| [73] | Assignee | Maschinenfabrik Augsburg-Nurnberg<br>Aktien-Gesellschaft<br>Nurnberg, Germany |
| [32] | Priority | Oct. 25, 1967 |
| [33] | | Germany |
| [31] | | P1,576,220 |

[54] PREHEATING ENGINE INTAKE AIR
4 Claims, 2 Drawing Figs.

[52] U.S. Cl. .................................................. 123/122,
123/179
[51] Int. Cl. ...................................................... F02m 31/00,
F02n 17/00
[50] Field of Search........................................... 123/122A1,
122A2, 122A3, 122D, 122F, 122G/144,
179H, 142.5

[56] References Cited
UNITED STATES PATENTS

| 1,413,564 | 4/1922 | Armstrong .................. | 123/122 |
| 1,442,632 | 1/1923 | Shortt.......................... | 123/122D |
| 1,724,481 | 8/1929 | Heginbottom................ | 123/122F |
| 3,353,520 | 11/1967 | Haag ........................... | 123/179H |

FOREIGN PATENTS

| 932,025 | 8/1963 | Great Britain................ | 123/142.5 |

*Primary Examiner*—Mark M Newman
*Assistant Examiner*—R. B Cox
*Attorneys*—Francis D. Stephens and Hugo Huettig, Jr.

ABSTRACT: A pocket in the engine intake air pipe contains a heater plug into which fuel is supplied, ignited and mixed with the passing intake air. An end wall in the pocket catches at least a portion of the burning fuel and directs it toward the heater plug.

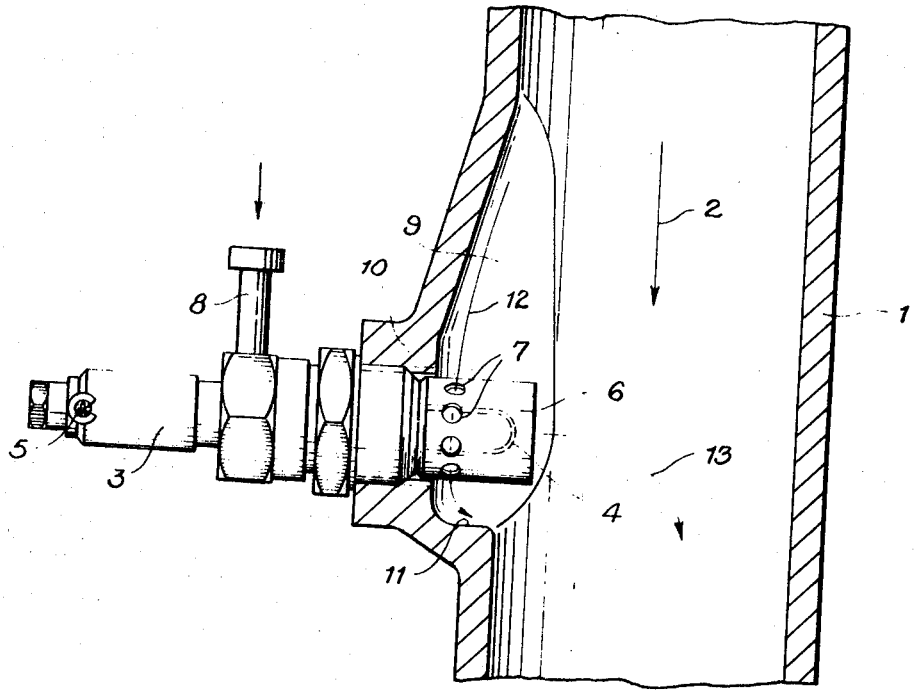

PREHEATING ENGINE INTAKE AIR

This invention relates to an apparatus for preheating the combustion air for an air-compressing internal combustion engine having fuel injection and which engine may be either of the free-suction or supercharge type. The apparatus of this invention for preheating the air is composed of a conventional electrically heated heater plug which is mounted in the intake air pipe. It can be a glow plug or a glowing coil which is surrounding and spaced from a jacket which is open toward the interior of the intake pipe. Several bores are in the circumference of the jacket through which a portion of the intake air can enter into the space between the jacket and the heater element. Also, in this preheating apparatus, diesel fuel branched off from the fuel tank is supplied in the space between the jacket and the heater element during or shortly before starting the engine. This fuel is enriched with air in the area close to the glow element and thus with oxygen, and the fuel is ignited. The flaming fuel then enters the intake air. The use of this preheating apparatus is not limited to only the starting of the engine. On the contrary, in many cases, as, for example, during extremely low outside temperatures or when fuels are used that are difficult to ignite, or even when the engine is running with a full load, it may be advisable to use the air preheating apparatus even after the engine has been running for a certain length of time or during the entire running time.

In heretofore used preheating devices of this type, the heater plug with its jacket, including the bores, has extended directly into the stream of intake air and actually throughout the entire length of the plug.

Also, heretofore the jacketed heater plug has been mounted partially in a cavity in the intake pipe so that the intake air is very favorably conducted in a stream toward the heater plug as well as being again introduced into the intake air stream following the heater plug.

The inflow portion of the intake air flowing toward the heater plug enters, in both cases, the space between the heater element and the jacket and leaves the space through the downstream directed bores, or at least a portion does, and this portion then has to be again combined with the main intake air stream. Indeed, an igniting frame has, in each instance, been formed in that portion of the air that stays within the jacket, but his portion is usually not intensive enough or has not entered the main flow of intake air at such an intensive enough force that the intake air is not sufficiently heated and that only when a very narrow range. Also, in this arrangement, the heating surface of the heater plug is not completely used since in the plug and along the heating element only a weak air movement takes place. It has also been shown that the heating flame is torn off when even when the heating air has a relatively low flow velocity and therefore a preheating of the intake air never took place.

The object of this invention is to avoid the above disadvantages and to produce a preheating device for intake combustion air which is operable under all operating conditions of an internal combustion engine.

In general, these objects are obtained by providing a preheating device in which, downstream from the heater plug, a wall is positioned against which a portion of the intake air flowing toward and passed the heater plug is caught and in this case, according to a further feature of this invention, the heater plug is mounted so that it is at least positioned in a pocket in the intake pipe, which pocket has a bottom inclined upwardly toward the base of the heater plug in the direction of the flow of the intake air and ends in a wall downstream of the hater plug which traps or catches the air. Also, the jacket around the heater element extends at least one-half of its length into the pocket.

In this way, it is possible to catch the intake air behind the heater plug as seen in the direction of the air flow in such a manner that an intensive heating flame can be created within the jacket of the heater plug which projects at right angles to or nearly at right angles to the direction of the flow of the intake air in order to be distributed in the air stream to effect an intense preheating over a relatively large area of the intake air stream. This also largely prevents that the preheating flame is torn off, even when the intake air has a relatively high flow velocity. By mounting the heater plug at least partially within the pocket in the intake pipe, it is possible to keep the heater plug and/or its jacket from the actual main stream of the intake air by a substantial amount so that the air stream is disturbed as little as possible. It is also advantageous in a further feature of the invention when the wall at the end of the pocket extends perpendicular to the longitudinal axis of the intake pipe. This feature helps to a great deal in preventing the air flow in the intake pipe from being disturbed as little as possible by the presence of the preheating device.

In this invention, the bores in the circumference of the jacket of the heater plug are positioned so that they are within the pocket and thus within the catching area of the end wall. This makes it possible that the air flows all around the glow plug and/or glow coil, and this is partially accomplished from the inflowing air side of the intake air and partially from the end wall side of the pocket, and this air can enter into the free open end of the jacket and, when mixed with fuel and ignited, ejected in the form of a flame into the intake air.

The bores in the heater plug jacket, according to this invention, can be arranged in one plane. However, in some cases, it may be more suitable to position these bores at different lengths along the jacket.

Figure 2:
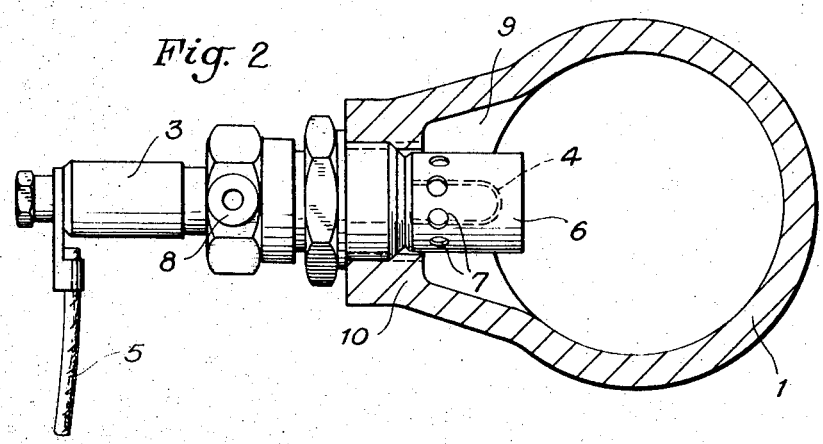

The means by which the objects of this invention are obtained are described more fully with reference to the accompanying schematic drawings in which:

FIG. 1 is a longitudinal cross-sectional view through the intake pipe with the preheater device mounted therein; and FIG. 2 is a side view of FIG. 1.

The intake air pipe 1 for an internal combustion engine, not shown, has flowing therethrough during the suction stroke of the engine piston the intake air in the direction of the arrow 2.

The air preheating device for the combustion air flowing in the intake pipe is composed of a heater plug 3 whose heater element 4 is electrically heated by current supplied through cable 5. The glow element 4 is surrounded and spaced from a, for example, cylindrical jacket 6 which is open toward the intake pipe and which has a plurality of bores 7.

The fuel is supplied to the heater element by a pipe line 8 after it has been suitably preheated either before or during the starting and/or idling of the engine. This fuel is vaporized in the space between the heater element 4 and the jacket 6.

The heater plug is mounted in a pocket 9 formed in the wall of the intake pipe and which has, for example, a trapezoidal-like cross section, FIG. 2. The heater plug is mounted in the thick wall portion 10 of the pocket. The bottom of the pocket, as shown in FIG. 1 and seen in the direction of the arrow 2, is steadily inclined up to the base of the jacket at the inner wall of the intake pipe and following the jacket ends in a wall 11 extending perpendicular to the longitudinal axis of the intake pipe. This wall 11 catches or traps the flow of a portion of the intake air.

The operation of this preheater device is as follows:

The intake combustion air during the suction stroke of the engine piston flows through the intake pipe 1 in the direction of arrow 2 and into the engine cylinder. During its flow toward the cylinder, a portion of the stream of intake air gets into pocket 9 and flows partially around the jacket 6 of the heater plug and partially through the bores 7 arranged in a circle on the circumference of the jacket and thus into the jacket. Since the air flow indicated by the arrow 12 is caught against end wall 11, a relatively large portion of this air can flow into jacket 6. There the air is mixed with the fuel supplied to the heating element 4 and/or the fuel vaporized at that point. The fuel thus obtains sufficient oxygen in order to ignite and form a flame which then shoots into the intake pipe as indicated by the arrow 13. The intake air therefor becomes intensely heated. Also, the bores are, as shown, positioned in such a way that they lie within the area of the wall 11. Also, the jacket 6 extends into at least one-half of the depth of the pocket 9.

Having now described the means by which the objects of this invention are obtained,

I claim:

1. Preheating means for the intake air in an internal combustion engine comprising an unobstructed intake air pipe, a pocket in the wall of said pipe, a heater plug having a base end and a heater element mounted in said pocket, a jacket extending from said base end and surrounding and spaced from said element, said jacket having an open end directed toward the interior of said pipe, bore means in said jacket within said pocket for the passage of intake air flowing in said pocket, means for supplying fuel into the space between said element and said jacket, and said pocket having a bottom steadily and gradually inclined in the direction of the air flow in said pipe up to the base end of said plug for directing air through said bore means and ending in wall means for catching at least a portion of the intake air and directing it into said bore means toward said heater element.

2. Preheating means as in claim 1, said jacket extending into at least one-half of the depth of said pocket.

3. Preheating means as in claim 2, said bores being positioned within the area of said wall means.

4. Preheating means as in claim 3, said wall means being perpendicular to the longitudinal axis of said pipe.